United States Patent
Nevin

(10) Patent No.: US 11,325,057 B2
(45) Date of Patent: May 10, 2022

(54) SEDIMENTARY TRAP

(71) Applicant: Donald Nevin, Syosset, NY (US)

(72) Inventor: Donald Nevin, Syosset, NY (US)

(*) Notice: Subject to any disclaimer, the term of this patent is extended or adjusted under 35 U.S.C. 154(b) by 0 days.

(21) Appl. No.: 17/034,055

(22) Filed: Sep. 28, 2020

(65) Prior Publication Data

US 2021/0093985 A1 Apr. 1, 2021

Related U.S. Application Data

(60) Provisional application No. 62/973,968, filed on Sep. 30, 2019.

(51) Int. Cl.
*B01D 21/00* (2006.01)
*B01D 29/05* (2006.01)
*C02F 1/00* (2006.01)

(52) U.S. Cl.
CPC .......... *B01D 21/0012* (2013.01); *B01D 29/05* (2013.01); *C02F 1/001* (2013.01); *B01D 2201/06* (2013.01); *C02F 2001/007* (2013.01)

(58) Field of Classification Search
CPC ................... B01D 21/0012; B01D 2221/10
See application file for complete search history.

(56) References Cited

U.S. PATENT DOCUMENTS 2,263,451 A * 11/1941 Bach .................. C02F 3/28
  210/603
2014/0047637 A1* 2/2014 Nevin .................. E03C 1/28
  4/679

FOREIGN PATENT DOCUMENTS

CN 107417018 A * 12/2017

OTHER PUBLICATIONS

Zhu Hui—CN 107417018 B Machine Translation—2017 (Year: 2017).*

* cited by examiner

*Primary Examiner* — Bradley R Spies
(74) *Attorney, Agent, or Firm* — Epstein Drangel LLP; Robert L. Epstein

(57) ABSTRACT

The trap includes a container with a top opening covered by a lid. Inlet and outflow pipes extend through the lid into the container. A sheet of mesh filtration material (fiberglass, foam etc.) is situated within the container, below and preferably bonded to the interior surface of the lid. The inlet and outflow pipes extend through the filtration sheet into the container such that as the water level rises, sediment from the water flowing through the container settles to the bottom of the container and floating particles on the surface of the water which would otherwise be carried out of the trap with the water as the water exits the container remain in the filtration sheet.

5 Claims, 2 Drawing Sheets

SEDIMENTARY TRAP

CROSS-REFERENCE TO RELATED APPLICATIONS

Figure 1:
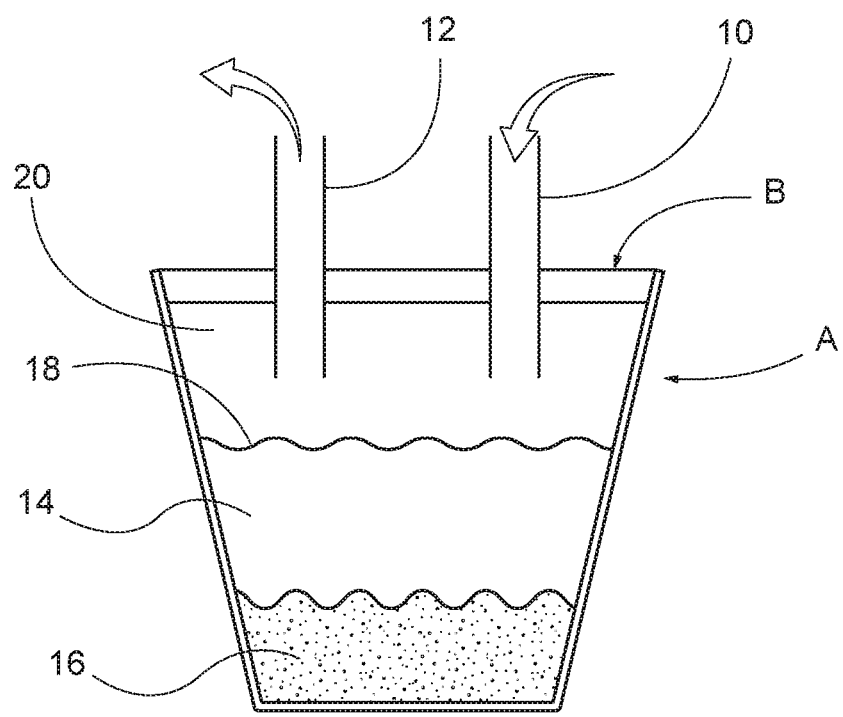

Priority is claimed on Provisional Patent Application No. 62973968, filed Sep. 30, 2019, the contents of which are incorporated herein by reference.

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to sedimentary traps and more particularly, to an improved sedimentary trap for plaster in the dental industry and other purposes.

2. Description of Prior Art Including Information Disclosed Under 37 CFR 1.97 and 1.98

The use of sedimentary traps (sometimes called "plaster traps") is common in the fields of dentistry, orthopedics, ceramic, food processing and other fields. In general they work by in effect increasing the diameter of a reservoir attached to a pipe—this has the effect of "slowing down" the flow of water passing through and gives the heavier than water particles time to fall to the bottom of the trap (often bucket shaped). When the trap has largely filled with sediment, it is sealed and disposed of in a proper landfill or according to local waste codes.

The above improves the characteristics of effluent water from a facility and decreases the chance of pipe blockage caused by accumulation of sediment and detritus in pipes. Many landlords may require installation of such traps in premises that are leased to water-using tenants.

Conventional sedimentary traps do an excellent job of trapping plaster and other sediments. However, floating particles are not trapped. Floating particles can reduce the quality of effluent water, cause pipe blockages and buildups, and the attendant plumbing costs. The floating materials may include polishing compounds, abrasives, waxes, plastics, plastic and other kerfs, as well as other materials related to any processing in the facility which would normally pass through the trap unobstructed and into the effluent pipe.

BRIEF SUMMARY OF THE INVENTION

In its most basic form, the invention includes a container with a top opening. The opening is covered by a lid. Inlet and outflow pipes extend through the lid into the container. A sheet of filtration material (fiberglass, foam etc.) is situated within the container, below the interior surface of the lid. The inlet and outflow pipes extend through the filtration sheet into the trap, as well.

When not in use, the water level in the container will generally be below the bottom surface of the filtration material sheet. When the trap is in use (i.e. water coming into the container via the inlet pipe and leaving the container by the effluent or outflow pipe, the particles floating on the surface of the water will rise with the surface of the water, come in contact with the filtration material sheet, and become entrained in the filtration material sheet mesh. Different materials may be used to optimize this entrainment.

The filtration sheet is penetrated by at least openings to allow the inlet and outflow pipes to pass water through the plane of the filtration sheet into the container without the floating particles being captured by the filtration sheet. Once the water is in the container, the sediment falls to bottom of the container unobstructed by the filtration sheet. The floating materials remain in the filtration sheet.

The filtration sheet is preferably attached to the interior of the lid by adhesive. It is disposed of as part of the entire unit when the whole trap is disposed of. The container always remains sealed and is never opened. It is possible to impregnate the filtration material with a biocide or other chemical agent, if desirable.

BRIEF DESCRIPTION OF THE SEVERAL VIEWS OF DRAWINGS

Figure 2:
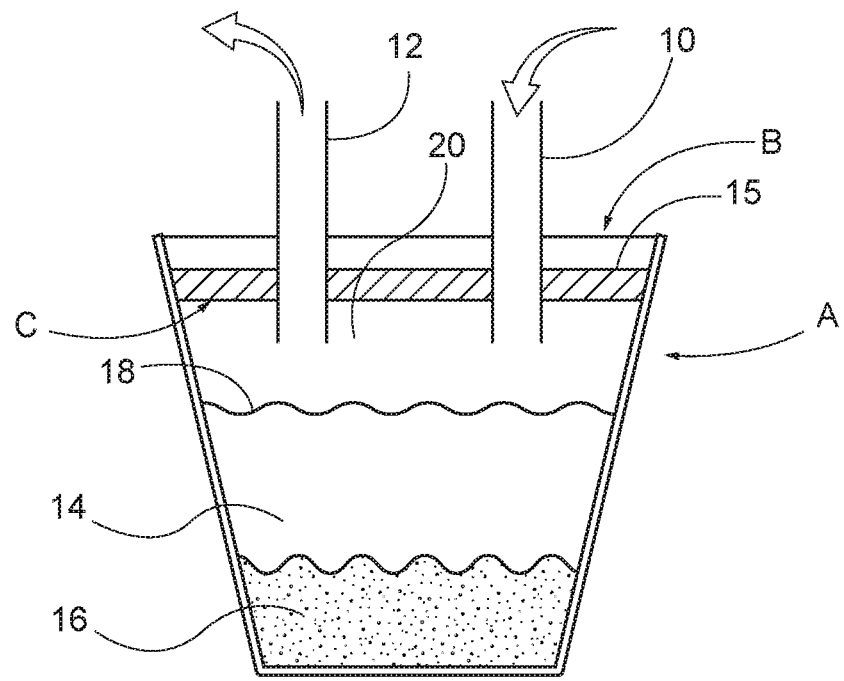
Figure 3:
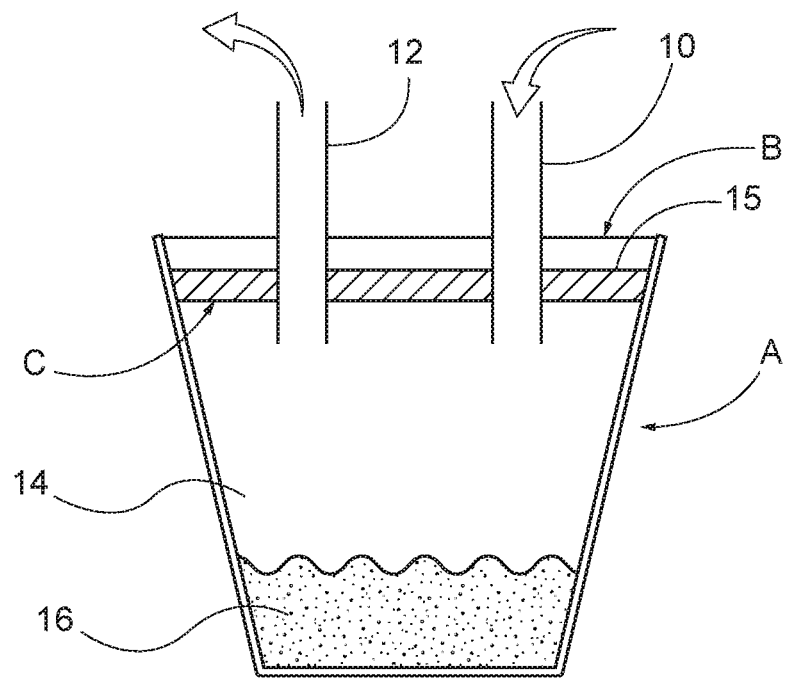

To these and to such other objects that may hereinafter appear, the present invention relates to a sedimentary trap as described in detail in the following specification and recited in the annexed claims, taken together with the accompanying drawings in which:

FIG. 1 a representation of a conventional sedimentary trap;

FIG. 2 is a representation of the preferred embodiment of the present invention not in use; and FIG. 3 is a representation of the preferred embodiment of the present invention in use.

DETAILED DESCRIPTION OF THE INVENTION

As illustrated in FIG. 1 of the drawings, a conventional sedimentary trap includes a container, generally designated A. As illustrated, container A is bucket-shaped and has a top opening. The container opening is covered and sealed by a lid, generally designated B.

Lid B has two openings. Inlet pipe 10 and outflow pipe 12 each extend through a different oner of the lid openings into the container.

In accordance with a preferred embodiment of the present invention, as illustrated in FIG. 2, a sheet of mesh filtration material (fiberglass, foam etc.), generally designated C, is situated within container A, immediately below the interior surface of lid B. The inlet pipe 10 and outflow pipe 12 extend through filtration sheet C into the container, as well. Preferably, filtration sheet C is bonded to the interior surface of lid B by a layer of adhesive 15 or is formed as an integral part of lid B.

As illustrated in FIG. 1, when a conventional trap is in use, water 14 comes into container A through inlet pipe 10 and leaves through effluent or outflow pipe 12. While the water is in the container, sediment 16 in the water will settle to the bottom of the container. The floating materials 18 in the water will float on the surface of the water, beneath airspace 20 and will exit the container with the water.

As seen in FIG. 3, when the trap of the present invention is in use, as container A fills up with water, the floating materials 18 on the surface of the water 14 will rise and contact filtration sheet C. The floating materials will become entrained in the mesh of filtration sheet C and will not exit the container with the water.

The filtration sheet is penetrated by at least openings to allow the pipes to pass water through the plane of the filtration sheet without the floating materials being picked up by the filtration sheet as they enter the container. Once in the container, the sediment in the water falls to the bottom of the container, unobstructed by the filtration sheet C. However, the floating particle remain in the filtration sheet.

In accordance with another aspect of the present invention, a method of capturing floating particulate matter in a sedimentary trap is provided. The trap comprises a container with a top opening, a lid having an interior surface covering the top opening, and inlet and outflow pipes extending through the lid into the container to allow water to flow through the container. The method comprising the following steps: situating a sheet of filtration material below the interior surface of the lid in the container; extending the inlet and outflow pipes through the filtration sheet; allowing the sediment from the water to fall to the bottom of the container as the water flows through the container; and capturing the particles floating on the surface of the water in container in the filtration sheet, such that water exiting the container is free of sediment and floating particles.

While only a single preferred embodiment of the present invention has been disclosed for purposes of illustration, it is obvious that many modifications and variations could be made thereto. It is intended to cover all of those modifications and variations which fall within the scope of the present invention, as defined by the following claims.

I claim:

1. A sedimentary trap comprising a container with a top opening, a lid having an interior surface covering said top opening, inlet and outflow pipes extending through said lid into said container, a sheet of filtration material situated within said container, below said interior surface of said lid, said inlet and outflow pipes extending through said filtration sheet into said container.

2. The trap of claim 1 wherein said filtration sheet is attached to said interior surface of said lid.

3. The trap of claim 1 wherein said filtration sheet is attached to said interior surface of said lid by adhesive.

4. The trap of claim 1 wherein said lid and said filtration material sheet comprise a unit.

5. A method of capturing floating particulate matter in a sedimentary trap comprising a container with a top opening, a lid having an interior surface covering the top opening, inlet and outflow pipes extending through the lid into the container to allow water to flow through the container, said method comprising the following steps:
   (a) situating a sheet of filtration material below the interior surface of the lid in the container;
   (b) extending the inlet and outflow pipes through the filtration sheet;
   (c) allowing the sediment from the water to fall to the bottom of the container as the water flows through the container; and
   (d) capturing the particles floating on the surface of the water in container in the filtration sheet, such that water exiting the container is free of sediment and floating particles.

* * * * *